(12) United States Patent
Hayabuchi et al.

(10) Patent No.: US 6,558,287 B2
(45) Date of Patent: May 6, 2003

(54) AUTOMATIC TRANSMISSION FOR A VEHICLE

(75) Inventors: Masahiro Hayabuchi, Anjo (JP); Masaaki Nishida, Anjo (JP); Satoru Kasuya, Anjo (JP); Kenji Gotou, Anjo (JP); Toshihiko Aoki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/073,139

(22) Filed: Feb. 13, 2002

(65) Prior Publication Data

US 2002/0142880 A1 Oct. 3, 2002

(30) Foreign Application Priority Data

Mar. 29, 2001 (JP) ........................................ 2001-097435

(51) Int. Cl.⁷ ................................................. F16H 3/62
(52) U.S. Cl. ........................ 475/271; 475/275; 475/286; 475/330
(58) Field of Search ................................. 475/271, 275, 475/286, 329, 330

(56) References Cited

U.S. PATENT DOCUMENTS

| | | | |
|---|---|---|---|
| 5,106,352 A | 4/1992 | Lepelletier | 475/280 |
| 5,226,862 A | 7/1993 | Hattori | 475/286 |
| 5,342,257 A * | 8/1994 | Hotta et al. | 475/275 |
| 5,520,588 A | 5/1996 | Hall, III | 475/218 |
| 5,542,889 A | 8/1996 | Pierce et al. | 475/275 |
| 6,110,069 A * | 8/2000 | Taniguchi et al. | 475/330 |
| 6,176,802 B1 * | 1/2001 | Kasuya et al. | 475/275 |
| 6,425,841 B1 * | 7/2002 | Haka | 475/286 |

\* cited by examiner

Primary Examiner—Sherry Estremsky
(74) Attorney, Agent, or Firm—Oliff & Berridge, PLC (57) ABSTRACT

A multi-speed automatic transmission improves transmission efficiency by reducing drag loss due to high speed rotation of a freely rotating element of a planetary gear set. An automatic transmission for a vehicle includes: an input path T1 of a first speed ratio; an input path T2 which has a larger speed ratio than this input path T1; a planetary gear set of four elements, wherein the four elements are a first element, a second element, a third element, and a fourth element following an order of elements on a speed diagram; a clutch C-2 transmitting a rotation of the input path T2 to the first element S3; a clutch C-1 transmitting the rotation from the input path T2 to the fourth element S2; a clutch C-4 transmitting a rotation from the input path T1 to the first element; a clutch C-3 transmitting the rotation from the input path T1 to the second element C3; a brake B-1 engaging the fourth element; a brake B-2 engaging the second element; and an output member coupled with the third element R3. Accordingly, drag resistance is prevented from increasing because no extremely high speed rotation of the freely rotating element is generated, even when a speed is achieved using any combination of the engagement elements.

7 Claims, 11 Drawing Sheets

FIG. 1

| | C-1 | C-2 | C-3 | C-4 | B-1 | B-2 | GEAR RATIO | SPREAD |
|---|---|---|---|---|---|---|---|---|
| 1st | | | | ○ | ○ | | 3.538 | 1.59 |
| 2nd | | ○ | | | ○ | | 2.226 | 1.26 |
| 3rd | | | ○ | | ○ | | 1.769 | 1.32 |
| 4th | | ○ | ○ | | | | 1.345 | 1.35 |
| 5th | | | ○ | ○ | | | 1.000 | 1.26 |
| 6th | ○ | | ○ | | | | 0.796 | 1.13 |
| 7th | ○ | | | ○ | | | 0.703 | 1.12 |
| 8th | ○ | ○ | | | | | 0.629 | |
| REV | | | | ○ | | ○ | 2.300 | |

| | C-1 | C-2 | C-3 | C-4 | B-1 | B-2 | GEAR RATIO | SPREAD |
|---|---|---|---|---|---|---|---|---|
| 1st | | | | ○ | ○ | | 3.310 | 1.56 |
| 2nd | | ○ | | | ○ | | 2.128 | 1.34 |
| 3rd | | | ○ | | ○ | | 1.593 | 1.29 |
| 4th | | ○ | ○ | | | | 1.237 | 1.24 |
| 5th | | | ○ | ○ | | | 1.000 | 1.20 |
| 6th | ○ | | ○ | | | | 0.829 | 1.15 |
| 7th | ○ | | | ○ | | | 0.721 | 1.12 |
| 8th | ○ | ○ | | | | | 0.643 | |
| REV | | | | ○ | | ○ | 2.897 | |

|   | C-1 | C-2 | C-3 | C-4 | B-1 | B-2 | GEAR RATIO | SPREAD |
|---|---|---|---|---|---|---|---|---|
| 1st |  |  |  | ○ | ○ |  | 3.926 | 1.59 |
| 2nd |  | ○ |  |  | ○ |  | 2.470 | 1.42 |
| 3rd |  |  | ○ |  | ○ |  | 1.745 | 1.39 |
| 4th |  | ○ | ○ |  |  |  | 1.252 | 1.25 |
| 5th |  |  | ○ | ○ |  |  | 1.000 | 1.25 |
| 6th | ○ |  | ○ |  |  |  | 0.799 | 1.15 |
| 7th | ○ |  |  | ○ |  |  | 0.695 | 1.10 |
| 8th | ○ | ○ |  |  |  |  | 0.629 |  |
| REV |  |  |  | ○ |  | ○ | 2.926 |  |

|  | C-1 | C-2 | C-3 | C-4 | B-1 | B-2 | GEAR RATIO | SPREAD |
|---|---|---|---|---|---|---|---|---|
| 1st |  |  |  | ○ | ○ |  | 3.829 | 1.59 |
| 2nd |  | ○ |  |  | ○ |  | 2.408 | 1.43 |
| 3rd |  |  | ○ |  | ○ |  | 1.680 | 1.37 |
| 4th |  | ○ | ○ |  |  |  | 1.229 | 1.23 |
| 5th |  |  | ○ | ○ |  |  | 1.000 | 1.24 |
| 6th | ○ |  | ○ |  |  |  | 0.807 | 1.16 |
| 7th | ○ |  |  | ○ |  |  | 0.697 | 1.11 |
| 8th | ○ | ○ |  |  |  |  | 0.629 |  |
| REV |  |  |  | ○ |  | ○ | 3.160 |  |

| | C-1 | C-2 | C-3 | C-4 | B-1 | B-2 | GEAR RATIO | SPREAD |
|---|---|---|---|---|---|---|---|---|
| 1st | | | | ○ | ○ | | 3.556 | 1.56 |
| 2nd | | ○ | | | ○ | | 2.286 | 1.35 |
| 3rd | | | ○ | | ○ | | 1.697 | 1.34 |
| 4th | | ○ | ○ | | | | 1.263 | 1.26 |
| 5th | | | ○ | ○ | | | 1.000 | 1.23 |
| 6th | ○ | | ○ | | | | 0.814 | 1.14 |
| 7th | ○ | | | ○ | | | 0.715 | 1.11 |
| 8th | ○ | ○ | | | | | 0.643 | |
| REV | | | | ○ | | ○ | 2.667 | |

|  | | GEAR SPEED AFTER SHIFTING | | | | | | | |
|---|---|---|---|---|---|---|---|---|---|
|  | | 1 | 2 | 3 | 4 | 5 | 6 | 7 | 8 |
| GEAR SPEED BEFORE SHIFTING | 1 |  | ○ | ○ |  | ○ |  | ○ |  |
| | 2 | ○ |  | ○ | ○ |  |  |  | ○ |
| | 3 | ○ | ○ |  | ○ | ○ | ○ |  |  |
| | 4 |  | ○ | ○ |  | ○ | ○ |  | ○ |
| | 5 | ○ |  | ○ | ○ |  | ○ | ○ |  |
| | 6 |  |  | ○ | ○ | ○ |  | ○ | ○ |
| | 7 | ○ |  |  |  | ○ | ○ |  | ○ |
| | 8 |  | ○ |  | ○ |  | ○ | ○ |  |

FIG. 16

AUTOMATIC TRANSMISSION FOR A VEHICLE

BACKGROUND OF THE INVENTION

1. Field of Invention

The present invention relates to a multi-speed automatic transmission employed in a vehicle, and particularly to a gear train thereof.

2. Description of Related Art

There have been demands for automatic transmissions mounted in vehicles to be multi-speed in order to ensure drivability and improve fuel consumption which is essential to conserve energy. In response to this demand there has arisen a need for further reduction of the number of gear change elements and engagement elements (hereinafter in this specification clutches and brakes will commonly be referred to as engagement elements) per speed of a gear train. Considering related art from this perspective, U.S. Pat. No. 5,226,862 discloses art which achieves six speeds by control according to five engagement elements by inputting two different rotations to a planetary gear set of four elements. This related art employs a structure wherein one element is a reaction force element which is engaged with a brake, which achieves a highest speed by increasing a rotation speed of an output element with respect to an input element.

In a planetary gear set of four elements, however, with the exception of a directly coupled speed, because one element is never involved with the transmission of power, rotation is not transferred with clutch engagement, nor is the element engaged by means of brake engagement because it is not a reaction force element. Therefore the element rotates freely because it is meshed with an element involved with the transmission of power. In particular with the related art, in the higher speeds of fifth speed and sixth speed, especially sixth speed, the highest speed which is used for the longest periods of time when normally driving a vehicle, the freely rotating element rotates at an extremely high speed along with the overdriven rotation of the output member. In this kind of state, resistance from the dragging of the disengaged engagement element connected to the freely rotating element, increases. This translates into a power transmission loss, thereby reducing transmission efficiency of the automatic transmission.

SUMMARY OF THE INVENTION

In view of this, it is a primary object of the present invention to improve transmission efficiency by reducing drag loss from an engagement element generated by an increase in the rotation speed of each element comprising the planetary gear set when each speed is achieved, and particularly in the highest speed. It is further an object of the present invention to improve transmission efficiency by making the highest speed the directly coupled speed and reducing gear transmission loss in an automatic transmission for a vehicle achieving multiple speeds by inputting two different speed ratios to the planetary gear set.

In order to achieve the foregoing objects, an automatic transmission for a vehicle according to the present invention comprises: a first input path having a fixed first speed ratio with respect to a rotation of an input shaft; a second input path having a fixed second speed ratio which is larger than the first speed ratio; a planetary gear set of four elements comprising a combination of a plurality of planetary gears, the four elements of the planetary gear set being a first element, a second element, a third element, and a fourth element following an order of elements on a speed diagram; a second clutch transmitting a rotation from the second input path to the first element; a first clutch transmitting the rotation from the second input path to the fourth element; a fourth clutch transmitting a rotation from the first input path to the first element; a third clutch transmitting the rotation from the first input path to the second element; a first brake engaging the fourth element; a second brake engaging the second element; and an output member coupled to the third element.

According to this aspect of the present invention, it is possible to prevent an increase in resistance from dragging of an engagement element connected to the freely rotating element because the element that would rotate freely does not rotate at an extremely high speed due to control of each element of the planetary gear set according to any engagement combination of the engagement elements. Moreover, control of the engagement elements while upshifting and downshifting is facilitated due to the fact that reverse rotation of the freely rotating element does not occur through any of the forward speeds.

According to another form of the foregoing aspect of the present invention, it is also effective to have, with respect to engagement of the first brake, a first speed achieved by engagement of the fourth clutch and a second speed achieved by engagement of the second clutch; with respect to engagement of the third clutch, a third speed achieved by engagement of the first brake, a fourth speed achieved by engagement of the second clutch, and a fifth speed achieved by engagement of the fourth clutch; with respect to the first clutch, a sixth speed achieved by engagement of the third clutch, a seventh speed achieved by engagement of the fourth clutch, and an eighth speed achieved by engagement of the second clutch.

According to this structure, it is possible to prevent an increase in resistance from dragging of an engagement element connected to a freely rotating element because extreme high speed rotation of an element that rotates freely when each forward speed is achieved is prevented, and particularly because, with the exception of third speed which is a low speed, free rotation that exceeds the input rotation does not occur. Control of the engagement elements while upshifting and downshifting is also facilitated due to the fact that reverse rotation of the freely rotating element does not occur through any of the forward speeds. Moreover, because the planetary gear set becomes directly coupled when the highest speed is achieved, it is possible to eliminate transmission loss of the planetary gear set in the highest speed, which is used for the longest periods of time during normal vehicle driving. Further, the combination of these characteristics improves the transmission efficiency of the automatic transmission.

According to yet another form of the foregoing aspect of the present invention, a structure may be employed which has an overdrive planetary gear for overdriving and outputting the rotation from the input shaft, wherein the input path from the overdrive planetary gear is the second input path, and the input path from the input shaft which does not pass through the overdrive planetary gear is the first input path.

According to this structure, rotation of the input path becomes directly coupled and overdriven rotation with respect to the input rotation. As a result, the speed ratio width from the lowest speed to the highest speed achieved based on these rotations extends in the direction of overdrive. This enables each gear ratio of multiple speeds to be set at a wide spread.

Further, according to still another form of the foregoing aspect of the present invention, it is also effective to have the planetary gear set comprise: a Ravigneaux type gear set in which the first element is a sun gear, the second element is a carrier supporting both a short pinion meshing with this sun gear and a long pinion meshing with this short pinion, the third element is a ring gear meshing with the long pinion, and the fourth element is another sun gear meshing with the long pinion.

According to this structure, it is possible to make a planetary gear set of four elements compact, in particular reducing the axial dimensions and thereby the axial length of the automatic transmission because the members connecting the elements of the planetary gear set are able to be eliminated.

DETAILED DESCRIPTION OF PREFERRED EMBODIMENTS

Figure 1:
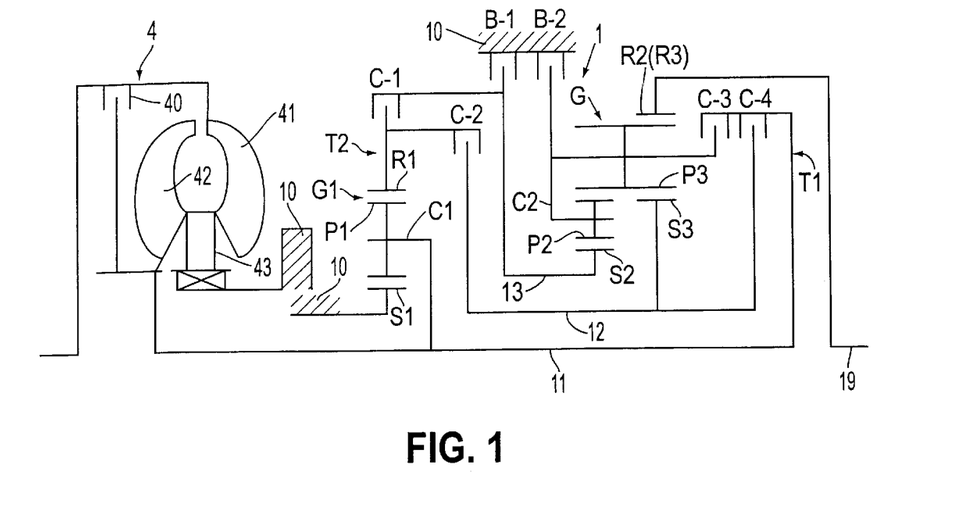
FIG. 1 is a skeleton view showing a gear train according to a first embodiment of an automatic transmission for a vehicle in which the present invention has been applied.
Figure 2:
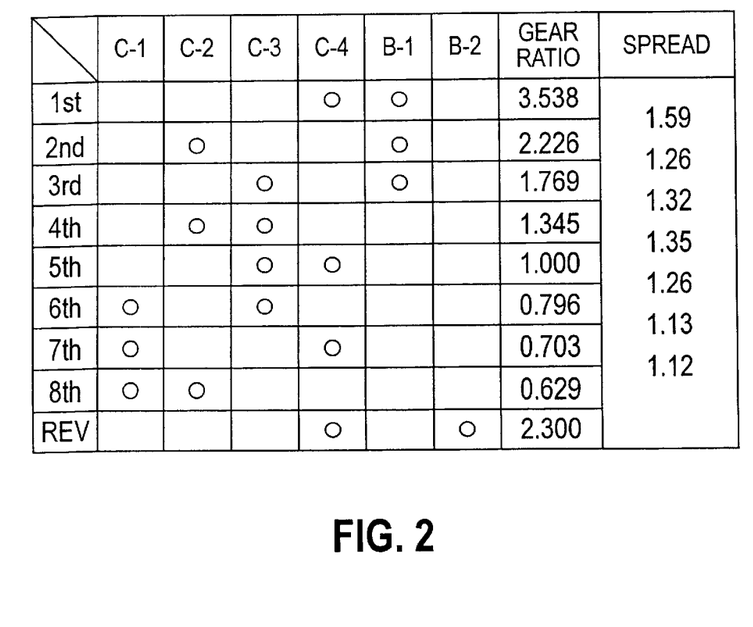
FIG. 2 is a chart showing example settings for gear ratios and gear ratio steps along with operation of the gear train according to the first embodiment.
Figure 3:
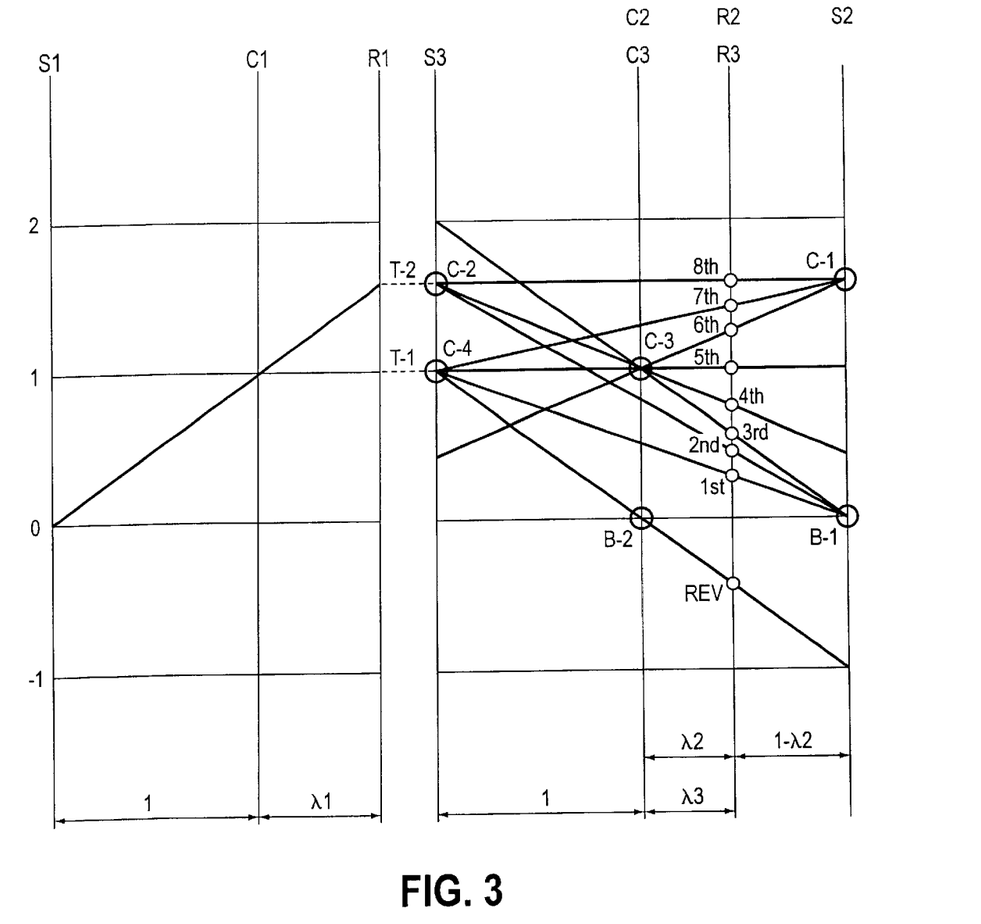
FIG. 3 is a speed diagram of the gear train according to the first embodiment.

Hereinafter the embodiments of the present invention will be described with reference to the drawings. FIGS. 1 through 3 show a first embodiment of an automatic transmission for a vehicle, in which the present invention has been employed. As in the skeleton illustrating the gear train structure shown in FIG. 1, this automatic transmission is arranged in a longitudinal direction with respect to the vehicle in a front engine rear drive (FR) vehicle.

The gear train comprises a torque converter 4 of three elements with a lock-up clutch 40 as a take-off device, and a transmission 1 positioned on the output side thereof. The torque converter 4 has a pump impeller 41, a turbine runner 42 and a stator 43. Moreover, the turbine runner 42 of the torque converter 4 is coupled to an input shaft 11 of the transmission 1 and an output element of the transmission is coupled to an output member 19.

The transmission 1 comprises: a first input path T1 having a fixed first speed ratio (a directly coupled speed ratio 1 in this embodiment) with respect to a rotation of an input shaft 11; a second input path T2 having a fixed second speed ratio (an overdrive speed ratio exceeding the speed ratio 1 in this embodiment) larger than the first speed ratio; a planetary gear set (Ravigneaux type planetary gear set in this embodiment) G of four elements comprising a combination of a plurality of planetary gears, the four elements of the planetary gear set G being a first element, a second element, a third element, and a fourth element following an order of elements on a speed diagram; a second clutch (C-2) for transmitting a rotation from the second input path T2 to the first element S3; a first clutch (C-1) for transmitting a rotation from the second input path T2 to the fourth element S2; a fourth clutch (C-4) for transmitting a rotation from the first input path T1 to a first element S3; a third clutch (C-3) for transmitting a rotation from the first input path T1 to a second element C2 (C3); a first brake (B-1) for engaging the fourth element S2; a second brake (B-2) for engaging the second element C2 (C3); and an output shaft 19 as an output member coupled to a third element R2 (R3). (Throughout this specification, each engagement element will be named in order beginning from nearest the torque converter on the input side in sequence. This also applies to the other embodiments that follow).

This gear train has an overdrive planetary gear G1 for overdriving and outputting a rotation from the input shaft 11 as means for generating rotation of a speed ratio in the second input path T2 which is different from that of the first input path T1. Accordingly, the input path from the overdrive planetary gear G1 is made the second input path T2 and an input path directly coupled to input shaft 11 that does not pass through the overdrive planetary gear G1 is made the first input path T1.

With respect to the four elements comprising the planetary gear set G, the first element S3 is a large diameter sun gear; the second element C2 (C3) is a common carrier gear which supports two pinion gears P2 and P3; the third element R2 (R3) is a common ring gear; and the fourth element S2 is a small diameter sun gear. The two pinion gears P2 and P3 comprise a long pinion P3 and a short pinion P2 which externally mesh together, and are related in such a way that the short pinion P2 externally meshes with the small diameter sun gear S2 and the long pinion gear P3 externally meshes with the large diameter sun gear S3 as well as internally meshes with the ring gear R3.

The overdrive planetary gear G1 is a simple planetary type having three elements: a sun gear S1, a carrier C1 supporting the pinion gear P1 which externally meshes with this sun gear S1, and a ring gear R1 which internally meshes with the pinion gear P1. With this construction, the carrier C1 is an input element coupled to the input shaft 11. The ring gear R1, as an output element, is coupled with the hub side of the first clutch (C-1) and with the drum side of the second clutch (C-2). The sun gear S1, as a reaction element, is fixed to a transmission case 10.

The first clutch (C-1) is a multi-disc clutch in which the hub side thereof is coupled with the ring gear R1 of the overdrive planetary gear G1 as the second input path T2 as mentioned above, and the drum side is coupled with the small diameter sun gear S2 via a power transmitting member 13.

The second clutch (C-2) is also a multi-disc clutch in which the drum side thereof is coupled with the ring gear R1 of the overdrive planetary gear G1 as the second input path T2 via a hub on the first clutch (C-1), and the hub side is coupled with the large diameter sun gear S3 of the planetary gear G via a power transmitting member 12.

The third clutch (C-3) is also a multi-disc clutch in which the drum side thereof is coupled with the input shaft 11 as the first input path T1 via a drum of the fourth clutch (C-4), and the hub side is coupled with the common carrier C2 (C3) of the planetary gear set G.

The fourth clutch (C-4) is also a multi-disc clutch in which the drum side thereof is coupled with the input shaft 11 as the first input path T1, and the hub side is coupled with the large diameter sun gear S3 of the planetary gear set G.

The first brake (B-1) is a multi-disc brake which is coupled with the drum of the first clutch (C-1) on the hub side, and which engages the small diameter sun gear S2 of the planetary gear set G with the transmission case 10 based on a connection via the first clutch (C-1) and the power transmission member 13 of the planetary gear set G.

The second brake (B-2) is a multi-disc brake in which the hub side thereof is coupled with the common carrier C2 (C3) of the planetary gear set G.

The automatic transmission constructed in this manner conducts speed changes based on vehicle load in a speed change range according to a range selected by the driver by means of control by an electronic control device and a hydraulic control device, both not shown. FIG. 2 shows a chart illustrating speeds achieved with engagement and disengagement of the clutches and brakes denoted by reference characters in the figure (a circle denotes engagement and an absence thereof denotes disengagement), a gear ratio of each speed, and gear ratio step (spread). The gear ratios shown as an example in this chart are set such that the gear ratio of the sun gear S1 to the ring gear R1 of the overdrive planetary gear G1 is $\lambda 1=0.590$, the gear ratio of the small diameter sun gear S2 to the common ring gear R2 (R3), i.e. on the double pinion side, of the planetary gear set G is $\lambda 2=0.435$, and the gear ratio of the large diameter sun gear S3 to the common ring gear R2 (R3), i.e. on the single pinion side, is $\lambda 3=0.435$. The input to output gear ratio in this case then is:

First speed ($1^{st}$): 3.538

Second speed ($2^{nd}$): 2.226 (Spread between $1^{st}$ and $2^{nd}$: 1.59)

Third speed ($3^{rd}$): 1.769 (Spread between $2^{nd}$ and $3^{rd}$: 1.26)

Fourth speed ($4^{th}$): 1.345 (Spread between $3^{rd}$ and $4^{th}$: 1.32)

Fifth speed ($5^{th}$): 1.000 (Spread between $4^{th}$ and $5^{th}$: 1.35)

Sixth speed ($6^{th}$): 0.796 (Spread between $5^{th}$ and $6^{th}$: 1.26)

Seventh speed ($7^{th}$): 0.703 (Spread between $6^{th}$ and $7^{th}$: 1.13)

Eighth speed ($8^{th}$): 0.629 (Spread between $7^{th}$ and $8^{th}$: 1.12)

Reverse (Rev): −2.300

The total spread is then 5.62.

Further, FIG. 3 shows a speed diagram of the relationship between the speeds achieved by engagement of the clutches and brakes (engagement thereof is denoted by a circle) and the speed ratio of each element at that time. The vertical axis of the speed diagram shows each of the elements of the overdrive planetary gear G1 and the planetary gear set G, respectively, with the horizontal width between each of the axes thereof showing the relationship of the gear ratios and the vertical positioning showing the speed ratios. The planetary gear set G has its first, second, third and fourth elements arranged at intervals corresponding to each gear ratio in the speed diagram in order of rotational speed. However, each of the fifth forward speed and the eighth forward speed integrally rotates the first, second, third and fourth elements of planetary gear set G. Incidentally, the sun gear S1 of the overdrive planetary gear G1 is fixed (speed ratio 0) and input (speed ratio 1) is applied to the carrier gear C1. As a result, an overdriven rotation is output to the ring gear R1 (the speed ratio of the intersecting points of the straight line connecting the point of the speed ratio 0 of the sun gear S1 and the speed ratio 1 of the carrier C1, and the vertical line denoting the ring gear R1 is 1.445 when the gear ratio is set as noted above. When this overdriven rotation is inputted to the small diameter sun gear S2 of the planetary gear set G by engagement of the first clutch (C-1), an overdriven rotation of the eighth speed to the sixth speed ($8^{th}$ to $6^{th}$) is output to the common ring gear R2 (R3) by inputting the overdriven rotation (speed ratio 1.445) or non-overdriven rotation (speed ratio 1) to the large diameter sun gear S3 or the common carrier C2 (C3) by engagement of any one of the second, third or fourth clutches.

As is evident by referring to FIGS. 1 through 3, the first speed ($1^{st}$) is achieved by engagement of the fourth clutch (C-4) and the first brake (B-1). In this case, rotation of the first speed ratio (non-overdriven rotation) from the input shaft 11 (the first input path T1) is input to the large diameter sun gear S3 via the fourth clutch (C-4). The reaction force is then taken from the small diameter sun gear S2 which is engaged by engagement of the first brake (B-1) such that a decelerated rotation of the largest reduction ratio of the common ring gear R2 (R3) is output to the output shaft 19.

Next, the second speed ($2^{nd}$) is achieved by engagement of the second clutch (C-2) and the first brake (B-1). In this case, rotation from the input shaft 11, which is overdriven via the overdrive planetary gear G1 is input to the large diameter sun gear S3 via the second input path T2 and the second clutch (C-2). The reaction force is then taken from the small diameter sun gear S2 which is engaged by engagement of the first brake (B-1) such that a decelerated rotation of the common ring gear R2 (R3) is input to the output shaft 19. The speed ratio at this time becomes larger than that of first speed ($1^{st}$) because the input rotation is an overdriven rotation.

Next, the third speed ($3^{rd}$) is achieved by engagement of the third clutch (C-3) and the first brake (B-1). In this case, non-overdriven rotation of the first input path T1 is input to the common carrier C2 (C3) via the third clutch (C-3). The reaction force is then taken from the small diameter sun gear S2 which is engaged by engagement of the first brake (B-1) such that a decelerated rotation of the common ring gear R2 (R3) is output to the output shaft 19. At this time, as is evident by referring to the speed diagram in FIG. 3, the large diameter sun gear S3 is not involved in power transmission and rotates freely in the same direction as the common carrier C2 (C3). The speed ratio of the large diameter sun gear S3, however, becomes 2 and does not overdrive excessively. Moreover, because it rotates in the same direction as the other elements, the speed ratio difference between the drum and the hub of the second clutch (C-2) when disengaged from the large diameter sun gear S3 (hereinafter referred to simply as the relative speed ratio, which includes also the speed ratio difference between the hub and the case of the brake) becomes 1 or less, and the relative speed ratio of the fourth clutch (C-4) also becomes 1 such that the dragging resistance is low.

Next, the fourth speed ($4^{th}$) is achieved by simultaneous engagement of the second clutch (C-2) and the third clutch (C-3). In this case, on one hand rotation of the second input path T2 from the input shaft 11 overdriven by the overdrive planetary gear G1 is input to the large diameter sun gear S3 via the second clutch (C-2), while on the other hand non-overdriven rotation of the first input path T1 input from the input shaft 11 via the third clutch (C-3) is input to the common carrier C2 (C3) such that decelerated rotation of the speed ratio of the amount of difference in rotation between the large diameter sun gear S3 and the common carrier C2 (C3) of the planetary gear set G is output to an output shaft 19 as rotation of the ring gear R2 (R3). At this time, as is clear by referring to the speed diagram in FIG. 3, the small diameter sun gear S2 is not involved in power transmission and rotates freely in the same direction as the common carrier C2 (C3). Because the speed ratio thereof is low, 1 or less, and the rotation is in the same direction as the other elements, however, the relative speed ratio of the first clutch (C-1) which is disengaged from the small diameter sun gear S2, becomes just above 1 and the relative speed ratio of the first brake (B-1) becomes approximately 0.5 such that an increase in drag resistance is able to be prevented.

Next, the fifth speed ($5^{th}$) is achieved by simultaneous engagement of the third clutch (C-3) and the fourth clutch (C-4). In this case, non-overdriven rotation of the first input path T1 from the input shaft 11 is input to the common carrier C2 (C3) via the third clutch (C-3) as well as to the large diameter sun gear S3 via the fourth clutch (C-4). As a result, the planetary gear set G becomes directly coupled such that the rotation thereof equals rotation of the common ring gear R2 (R3) which is output to the output shaft 19. In this case, there is no gear transmission loss because the relative rotation of all of the elements of the planetary gear set G is eliminated. The relative speed ratios of the clutches and brakes which remain in a disengaged state at this time all become 1 or less such that the drag resistance is also low.

The sixth speed ($6^{th}$) is achieved by simultaneous engagement of the first clutch (C-1) and the third clutch (C-3). In this case, on one hand rotation of the second input path T2 via the first clutch (C-1) which was overdriven by the overdrive planetary gear G1 is input to the small diameter sun gear S2, while on the other hand non-overdriven rotation of the first input path T2 via the third clutch (C-3) from the input shaft 11 is input to the common carrier C2 (C3), such that a rotation between the rotations of the common carrier C2 (C3) and the small diameter sun gear S2 is output to the output shaft 19 from the common ring gear R2(R3). The large diameter sun gear S3 becomes a freely rotating element at this time; however, because the rotation thereof becomes far smaller than the speed ratio 1 and is in the same direction as the input rotation, the relative speed ratio of the second clutch (C-2) which is disengaged from the large diameter sun gear S3 is low at approximately 1 and the relative speed ratio of the fourth clutch (C-4) is low at 1 or less and the drag resistance is small.

Next, the seventh speed ($7^{th}$) is achieved by simultaneous engagement of the first clutch (C-1) and the fourth clutch (C-4). In this case, on one hand rotation of the second input path T2 via the first clutch (C-1), which was overdriven by the overdrive planetary gear G1 is input to the small diameter sun gear S2, while on the other hand non-overdriven rotation of the first input path T1 via the fourth clutch (C-4) from the input shaft 11 is input to the large diameter sun gear S3, such that an overdriven rotation between the rotations of the large diameter sun gear S3 and the small diameter sun gear S2 is output to the output shaft 19 from the common ring gear R2 (R3). The rotation of the common carrier R2 (R3), which is a freely rotating element at this time, becomes a speed ratio between the overdriven rotation and the non-overdriven rotation, the relative speed ratio of the third clutch (C-3) which is disengaged therefrom is extremely small, and the relative speed ratio of the second brake (B-2) is just above 1 and the drag resistance in this case is also small.

The eighth speed ($8^{th}$) is achieved by simultaneous engagement of the first clutch (C-1) and the second clutch (C-2). In this case, both clutches are clutches of the second input path T2 which inputs output rotation of the overdrive planetary gear G1. Therefore the rotation of both the large and small sun gears S3 and S2 are the same speed and the planetary gear set G becomes directly coupled such that the output rotation of the overdrive planetary gear G1 is output to the output shaft 19 from the common ring gear R2 (R3) as it is. Just as with the case of fifth speed ($5^{th}$), in this case as well gear transmission loss is eliminated because the relative rotation of all of the elements of the planetary gear set G is eliminated. Regarding the relative speed ratio of the remaining engagement elements at this time, those for both brakes are at their maximum of 1.447; however, these values are small enough so that drag resistance does not become a problem.

Reverse (Rev) is achieved by engagement of the fourth clutch (C-4) and the second brake (B-2). In this case, reverse is achieved by non-overdriven rotation from the input shaft 11 being input to the large diameter sun gear S3 via the fourth clutch (C-4) and reverse rotation of the common ring gear R2 (R3) which takes the reaction force from the common carrier C2 (C3) which is engaged by engagement of the brake (B-2) being output to the output shaft 19. The small diameter sun gear S2 which becomes a freely rotating element in this case only rotates in reverse with respect to the input rotation. The relative speed ratio of the first clutch (C-1) at this time becomes a speed ratio 2 of the reverse rotation with respect to overdriven rotation on the hub side (a speed ratio of 1.445 in the case of the example gear ratio setting) so as to become 3.445, which is the largest of all of the speeds. Because this speed is a reverse speed which is only used for short periods of time, the effect that this drag loss has on vehicle running is extremely low.

Therefore, according to the gear train as described in the aforementioned first embodiment, it is possible to eliminate a delay in shifting which occurs due to the inertia of each of the elements during shifting, because reverse rotation of each element of the planetary gear set G does not occur in any of the forward speeds. Also, with automatic transmissions the transmission is often used in oil. At this time, while drag of the oil between each of the elements does occur, because there is no reverse rotation of any of the elements in the forward speeds as described above, the relative rotation speed between the elements is controlled such that drag from the oil is reduced thus improving efficiency. Further, if the relative rotation speed between the elements is able to be controlled, the load on the bearings provided between the elements is reduced so it is advantageous from the viewpoint of durability. Also, because the speed ratios of each of the elements do not become extremely high, the drag of each of the engagement elements as well as the load of the bearings supporting each of the elements is able to be controlled so as to be low. Moreover, because the relative rotation of the four elements is eliminated due to the direct connection of the planetary gear set G in the highest speed which is used for long periods of time, the gear transmission loss is also eliminated. The combination of these conditions enables a gear train having good efficiency to be realized.

Figure 16:
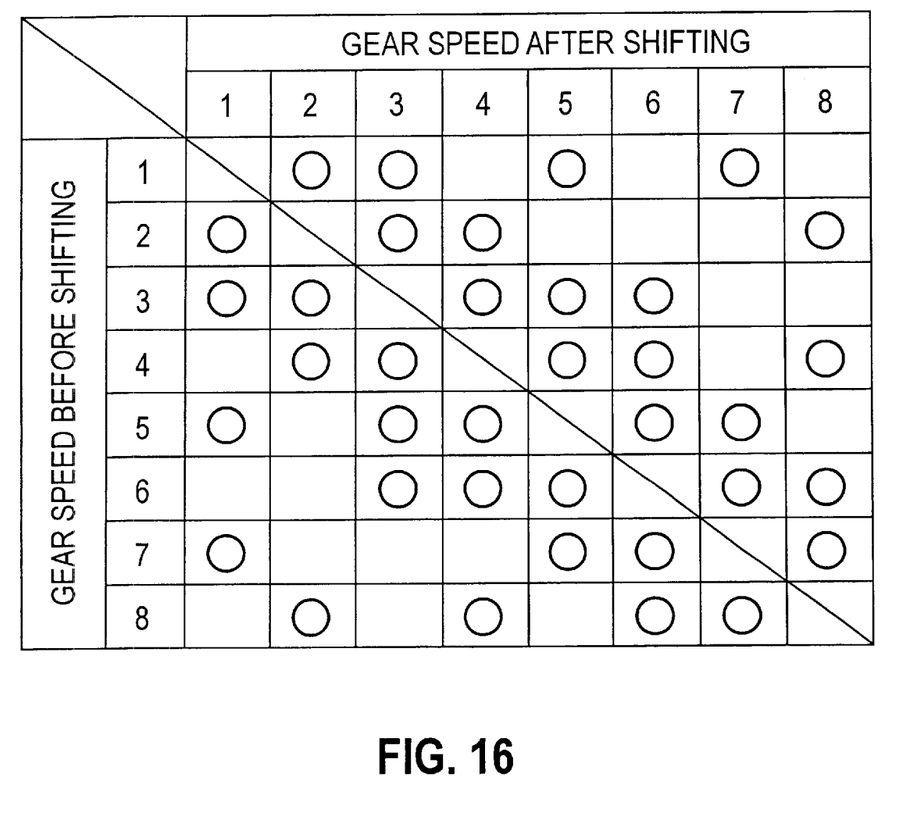
FIG. 16 is a chart showing a relationship of gear speeds in which shifting is possible without simultaneous re-gripping of two elements, in each of the embodiments.

Meanwhile, from the engagement relationship in the foregoing embodiment, in the case of achieving each speed, shifting is possible without the need of a shifting operation in which two engagement elements are released and two engagement elements are engaged, i.e. simultaneous re-gripping of two elements, as is evident by referring to the engagement chart in FIG. 2. Shifting in which this simultaneous re-gripping of two elements is eliminated is advantageous because it avoids making the shift control complex. In this gear train, this is possible in many cases, even in the case of jumping speeds, with the exception of two or three. FIG. 16 shows the overall relationship between the gear speed before shifting and the gear speed after shifting when jumping speeds. In this chart, a circle denotes a speed of which achievement is possible without the simultaneous re-gripping of two elements. Incidentally, when the gear speed before shifting is the first speed, the second speed, third speed, fifth speed, and seventh speed become speeds of which achievement is possible without simultaneous re-gripping of two elements. With respect to shifting from other speeds, the description may be replaced with reference to this chart. It should be noted that this relationship is the same for each of the following embodiments.

Figure 4:
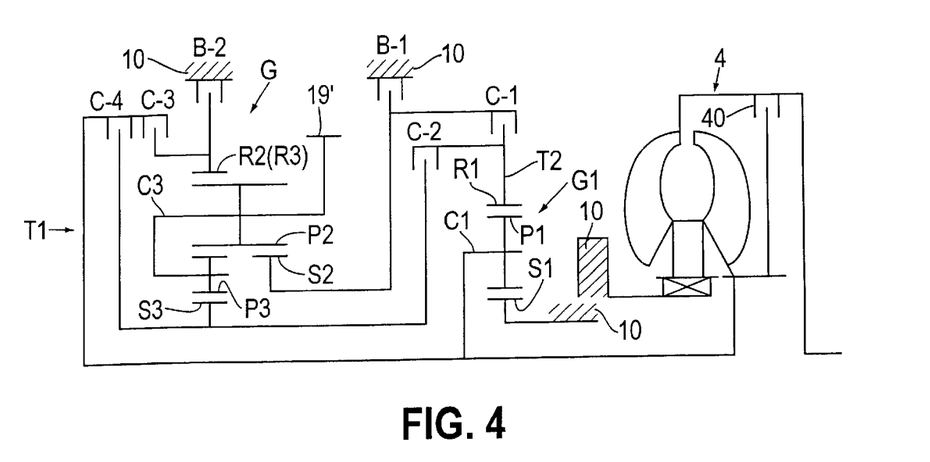
FIG. 4 is a skeleton view showing a gear train of a second embodiment.
Figure 5:
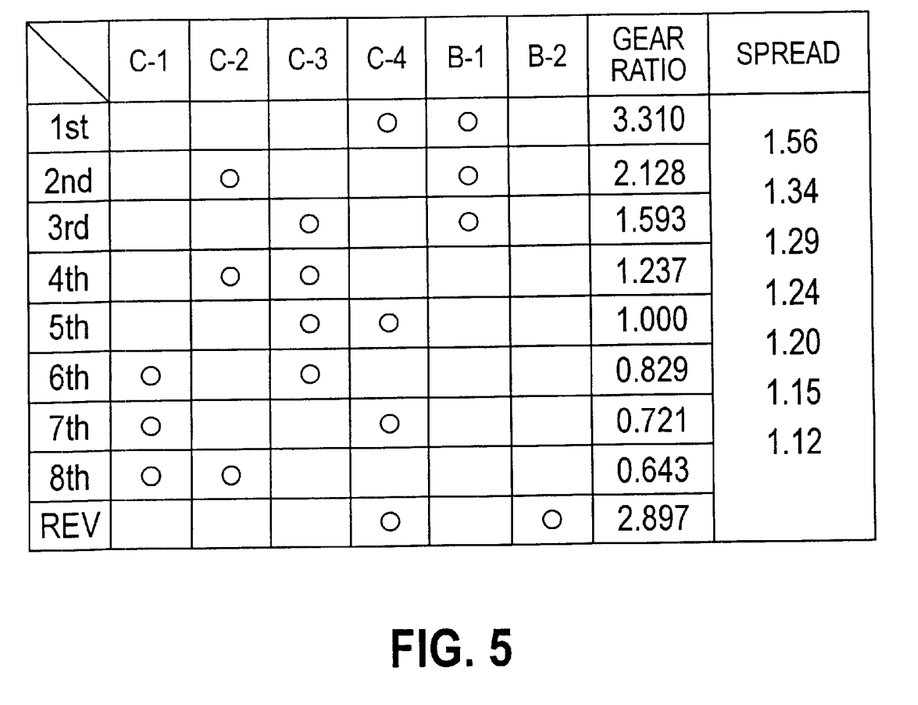
FIG. 5 is a chart showing example settings for gear ratios and gear ratio steps along with operation of the gear train according to the second embodiment.
Figure 6:
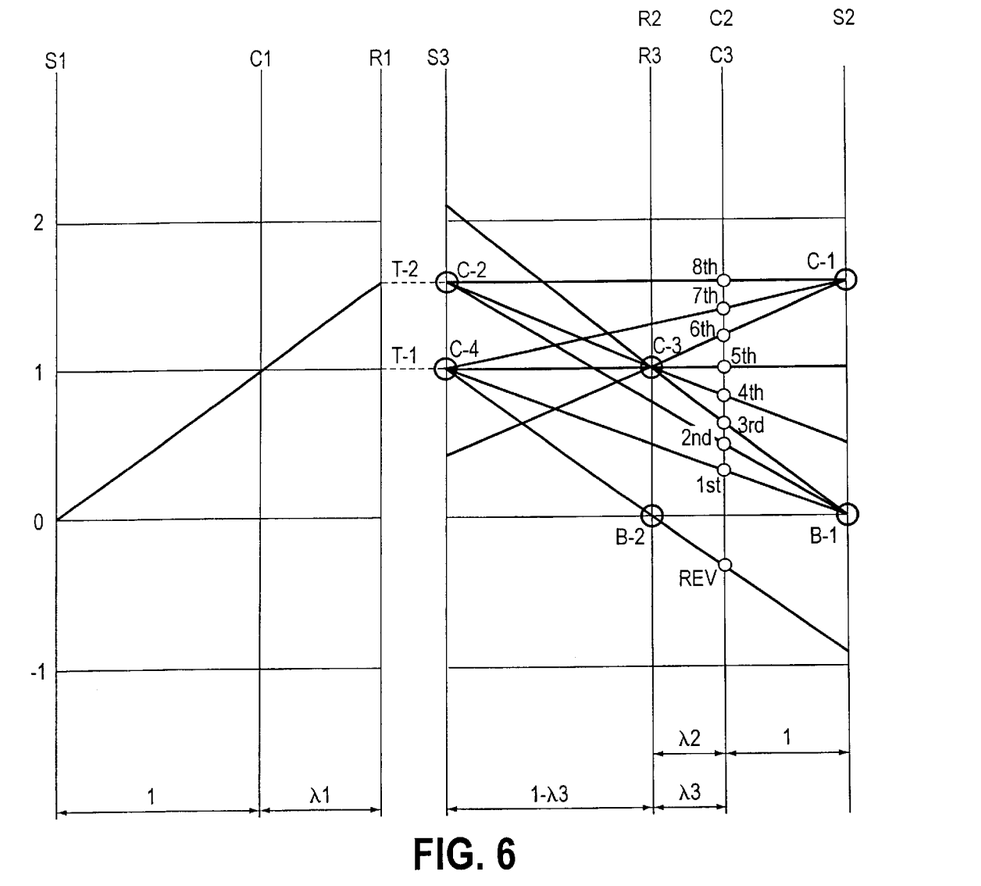
FIG. 6 is a speed diagram of the gear train according to the second embodiment.

Next, FIGS. 4 through 6 show a second embodiment in which a gear train, in which the planetary gear set is a Ravigneaux type just as in the first embodiment, is transversely provided in a front engine front drive (FF) or rear engine rear drive (RR) vehicle. This gear train includes a torque converter 4 having three elements with a lock-up clutch 40 provided on an input side of a main shaft, and a transmission 1 positioned on an output side thereof. The output of the transmission 1 is transmitted via a counter shaft, not shown, aligned in a position with respect to the main shaft from a counter gear 19' as an output member to a differential shaft, not shown, which is aligned in the same position.

The structures of the torque converter 4 and the overdrive planetary gear G1 and the planetary gear set G of the transmission 1 in this embodiment are the same as that in the first embodiment, and the connecting relationships from the torque converter 4 to the hub side of the first clutch (C-1) via the first and second input paths T1 and T2 and the drum side of the second, third and fourth clutches (C-2, C-3, C-4) are also the same as those in the first embodiment. Therefore, a description of these will be omitted, and the following description will focus on modifications of the connecting relationships of the following structure.

In this embodiment, the small diameter sun gear S3, as the first element, of the Ravigneaux type planetary gear set G as a planetary gear set of four elements is coupled with the second clutch (C-2); the common ring gear R2 (R3), as the second element, is coupled with the hub side of the third clutch (C-3) and the hub side of the second brake (B-2); the common carrier C2 (C3), as the third element, is coupled with the counter gear 19' as an output member; and the large diameter sun gear S3, as the fourth element, is coupled with the drum side of the first clutch and the hub side of the first brake (B-1).

FIG. 5 shows a chart illustrating speeds achieved with engagement and disengagement of the clutches and brakes denoted by reference characters in the figure (a circle denotes engagement and an absence thereof denotes disengagement), and the gear ratio of each speed. The relationship of the engagement of each of the engagement elements, and the speeds achieved is the same as in the first embodiment. The gear ratios shown in this chart are set such that the gear ratio of the sun gear S1 to the ring gear R1 of the overdrive planetary gear G1 is $\lambda 1=0.556$, the gear ratio of the large diameter sun gear S3 to the common ring gear R2 (R3), i.e. on the double pinion side, of the planetary gear set G is $\lambda 2=0.59$, and the gear ratio of the small diameter sun gear S2 to the common ring gear R2 (R3), i.e. on the single pinion side, is $\lambda 3=0.257$. To avoid redundancy, the citation of each of the numeric values of the input and output gear ratios (gear ratio) and the gear ratio step (spread) in this case will be omitted, however they are shown in the chart. The total spread is then 5.15.

In this embodiment in particular, as is evident by referring to the gear ratio step (spread), in all of the gear ratio steps from between the first and second speeds to between the seventh and eighth speeds, the gear ratio step becomes smaller as the speed becomes higher, and an extremely good characteristic is obtained wherein there is no reverse rotation throughout.

Also, FIG. 6 is a speed diagram showing the relationship between the speeds achieved by engagement of the clutches and brakes (engagement of these is denoted by a circle), and the speed ratio of each element at that time following the same method illustrated in the first embodiment. In this embodiment, the common carrier C2 (C3) as the aforementioned third element becomes an output element and a ring gear R3 (R2) is used as the second element. As a result, the relationship between the element controlled by the engagement of the third clutch (C-3) and engagement of the second brake (B-2) and the output element is reversed from what it was in the first embodiment. The speed ratio of these in each speed is also reversed, but the behavior of both sun gears S2 and S3 with respect to engagement of each engagement element at each speed is the substantially the same. The free rotation speed ratio of the sun gear S3 as the first element when in third speed, however, increases slightly with respect to what it was in the first embodiment due to the relationship of the gear ratio settings. Conversely, the free rotation speed ratio of the sun gear S2 as the fourth element when in reverse decreases slightly with respect to what it was in the first element.

Figure 7:
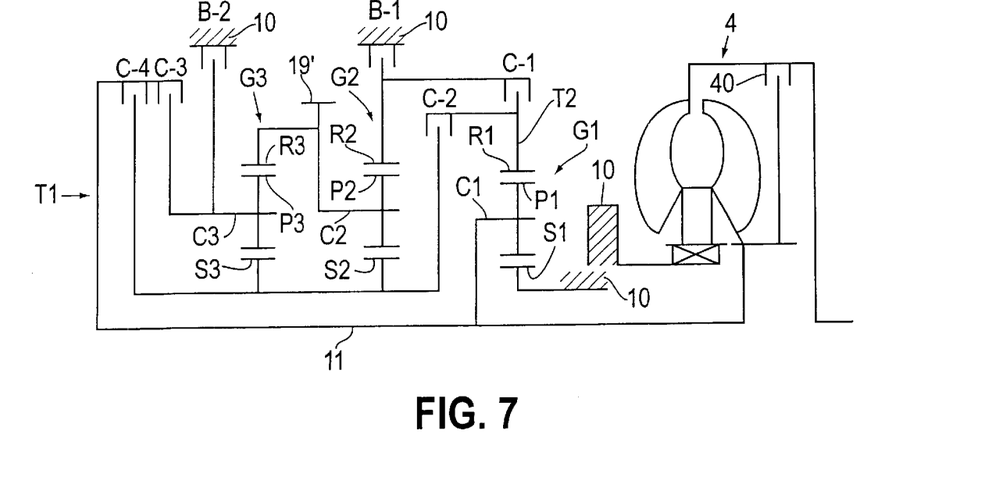
FIG. 7 is a skeleton view of a gear train according to a third embodiment.
Figure 8:
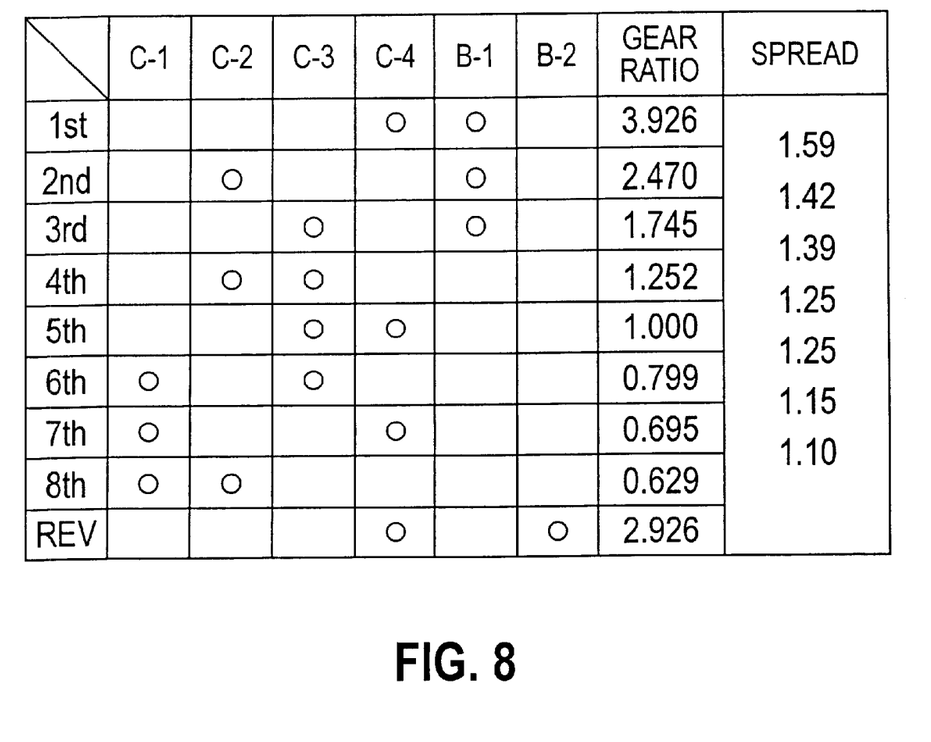
FIG. 8 is a chart showing example settings for gear ratios and gear ratio steps along with operation of the gear train according to the third embodiment.
Figure 9:
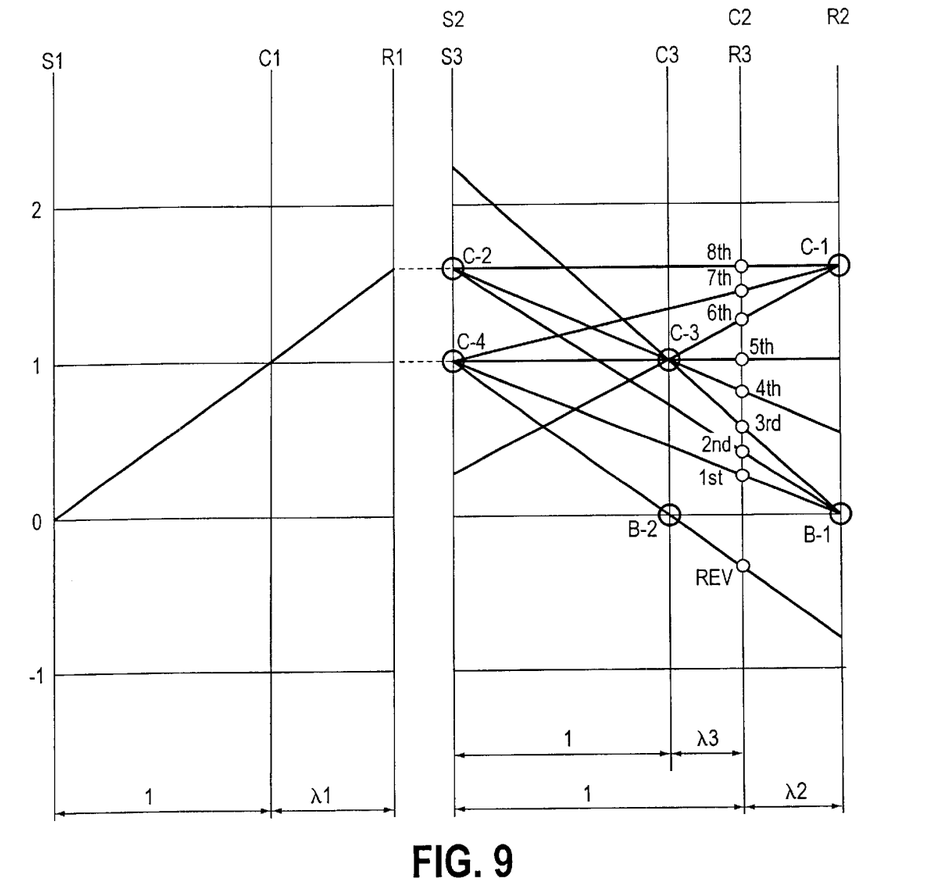
FIG. 9 is a speed diagram of the gear train according to the third embodiment.

Next, FIGS. 7 through 9 show a third embodiment of a modification of the planetary gear set of four elements of the second embodiment. Describing only the differences of this case from the second embodiment with reference to the skeleton in FIG. 7, the planetary gear set which was a Ravigneaux type in the second embodiment is a so-called Simpson type gear set made into four elements by connecting two simple planetary gears G2 and G3 of three elements by coupling sun gear to sun gear and carrier to ring gear. That is, the two simple planetary gears G2 and G3 of three elements are made into four elements by coupling the carrier C2 of the planetary gear G2 to the ring gear R3 of the planetary gear G3 and coupling both sun gears S2 and S3 together. In this case, both sun gears S2 and S3, as a first element, of both planetary gears G2 and G3 are coupled with the hub side of the second clutch (C-2) and the hub side of the fourth clutch (C-4); the carrier C3 of the planetary gear G3, as the second element, is coupled with the hub side of the third clutch (C-3) and the hub side of the second brake (B-2); the carrier C2 and the ring gear R3 which are connected together, as the third element, are coupled with the counter gear 19'; and the ring gear R2 of the planetary gear G2, as the fourth element, is coupled with the drum side of the first clutch (C-3) and the hub side of the first brake (B-1).

The relationship between each of the engagement elements and the speeds achieved in the third embodiment is, as shown in FIG. 8, exactly the same as in the preceding embodiments. This engagement chart shows an example of the gear ratio and gear ratio step when the gear ratio of the overdrive planetary gear G1 is set at $\lambda 1=0.590$, the gear ratio of the planetary gear set G2 is set at $\lambda 2=0.342$, and the gear ratio of the planetary gear set G3 is set at $\lambda 3=0.342$. The total spread in this case is 6.24. The gear ratio step in this embodiment is also the same as that in the second embodiment, with no reverse rotation and it becomes extremely good closer to the high speed side.

FIG. 9 shows a speed diagram showing the relationship between the speeds achieved by engagement of the clutches and brakes (engagement of these is denoted by a circle), and the speed ratio of each element at that time following the same method illustrated in the second embodiment. In this embodiment, the carrier C2 and the ring gear R3 as the aforementioned third element become output element and a carrier C3 is used as the second element. As a result, the relationship between the element controlled by the engagement of the third clutch (C-3) and engagement of the second brake (B-2) and the output element is reversed from what it was in the second embodiment. The speed ratio of these in each speed is also reversed, but the behavior of both sun gears S2 and S3 and the ring gear R2 with respect to engagement of each engagement element at each speed is substantially the same. The free rotation speed ratio of both sun gears S2 and S3 as the first element when in third speed, however, increases slightly with respect to what it was in the second embodiment due to the relationship of the gear ratio settings. Conversely, the free rotation speed ratio of the ring gear R2 as the fourth element when in reverse decreases slightly with respect to what it was in the second embodiment.

Figure 10:
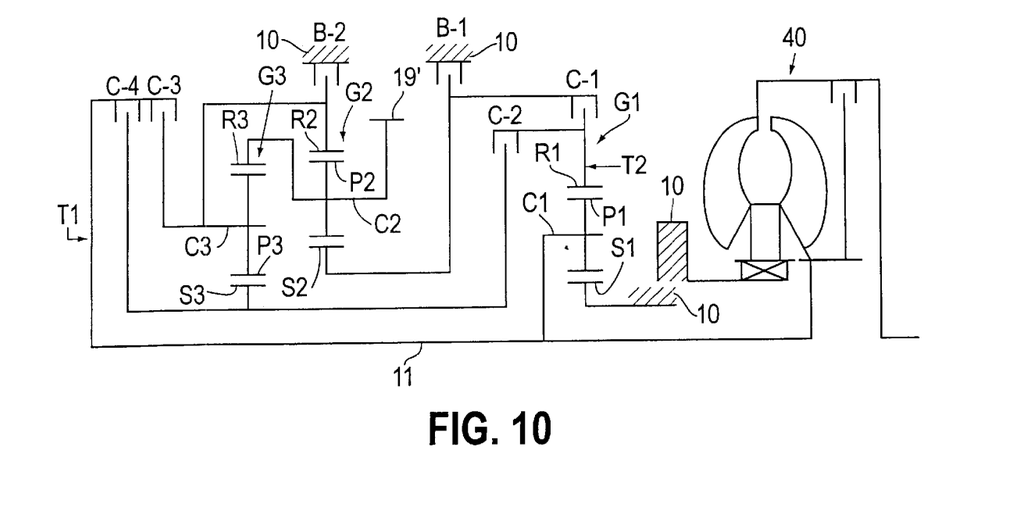
FIG. 10 is a skeleton view of a gear train according to a fourth embodiment.
Figure 11:
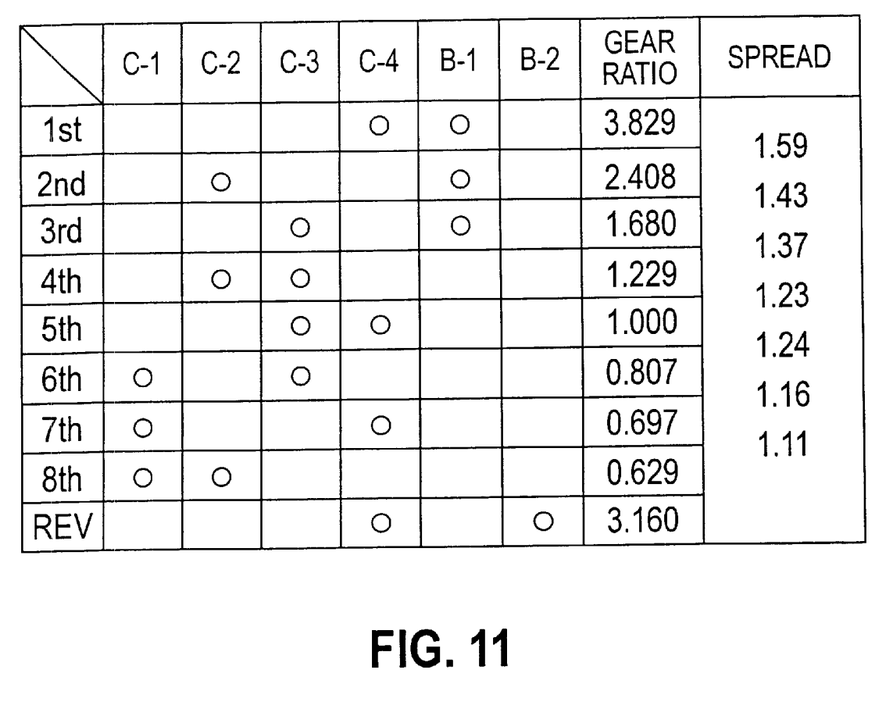
FIG. 11 is a chart showing example settings for gear ratios and gear ratio steps along with operation of the gear train according to the fourth embodiment.
Figure 12:
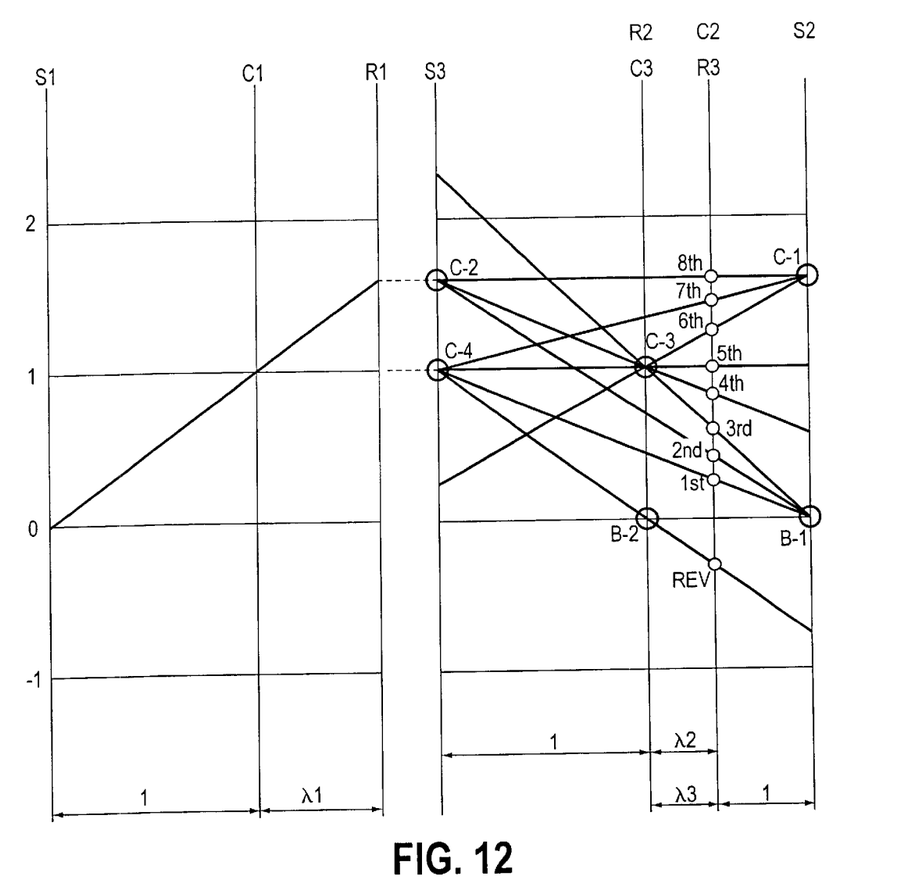
FIG. 12 is a speed diagram of the gear train according to the fourth embodiment.

Next, FIGS. 10 through 12 show a fourth embodiment of a modification of the planetary gear set of four elements of the third embodiment. Describing only the differences of this case from the third embodiment with reference to the skeleton in FIG. 10, this planetary gear set is of a so-called CR-CR coupled type construction in which the simple planetary gears G2 and G3 are made into four elements by coupling the two carrier ring gears together instead coupling sun gear to sun gear and carrier to ring gear. That is, the two simple planetary gears G2 and G3 of three elements are made into four elements by coupling the carrier C2 and the ring gear R3 together and coupling the ring gear R2 and the carrier C3 together. In this case, the sun gear S3, as the first element, of the planetary gear G3 is coupled with the hub side of the second clutch (C-2) and the hub side of the fourth clutch (C-4); the carrier C3 and the ring gear R2 which are connected together, as the second element, are coupled with the hub side of the third clutch (C-3) and the hub side of the second brake (B-2); the carrier C2 and the ring gear R3 which are also connected together, as the third element, are coupled with the counter gear 19'; and the sun gear S2 of the planetary gear G2, as the fourth element, is coupled with the drum side of the first clutch (C-1) and the hub side of the first brake (B-1).

The relationship between each of the engagement elements and the speeds achieved in the fourth embodiment is, as shown in FIG. 11, exactly the same as in the preceding embodiments. This engagement chart shows the gear ratio and gear ratio step when the gear ratio of the overdrive planetary gear G1 is set at $\lambda 1=0.590$, the gear ratio of the planetary gear set G2 is set at $\lambda 2=0.680$, and the gear ratio of the planetary gear set G3 is set at $\lambda 3=0.316$. The total spread in this case is 6.09. The gear ratio step in this embodiment is partially reversed between fourth speed and fifth speed.

FIG. 12 shows a speed diagram showing the relationship between the speeds achieved by engagement of the clutches and brakes (engagement of these is denoted by a circle), and the speed ratio of each element at that time following the same method illustrated in each of the foregoing embodiments. In this embodiment, the carrier C2 and the ring gear R3 as the aforementioned third element become an output element and a carrier C3 and ring gear R2 are used as the second element. As a result, the relationship between the element controlled by the engagement of the third clutch (C-3) and engagement of the second brake (B-2) and the output element is reversed from what it was in the second embodiment. The speed ratio of these in each speed is also reversed, but the behavior of both sun gears with respect to engagement of each engagement element at each speed is substantially the same. The free rotation speed ratio of the sun gear S3 as the first element when in third speed, however, increases slightly with respect to what it was in the third embodiment due to the relationship of the gear ratio settings. Conversely, the free rotation speed ratio of the sun gear S2 as the fourth element when in reverse decreases slightly with respect to what it was in the third embodiment.

Figure 13:
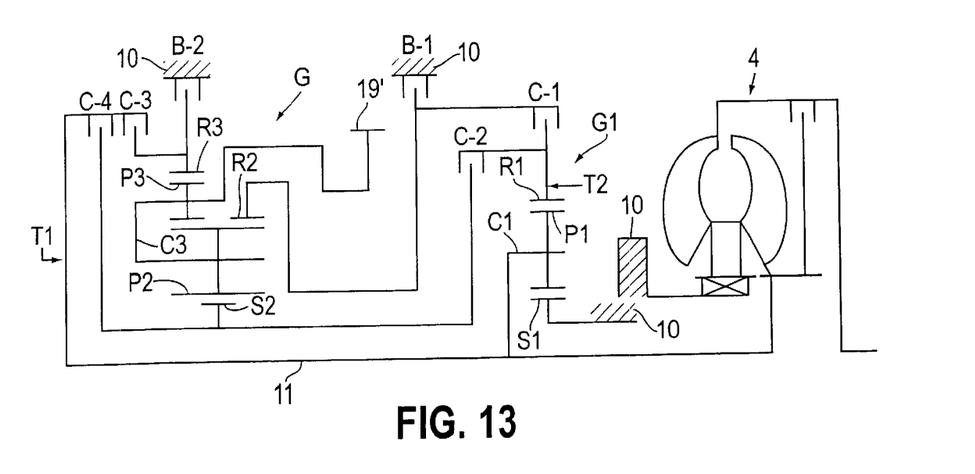
FIG. 13 is a skeleton view of a gear train according to a fifth embodiment.
Figure 14:
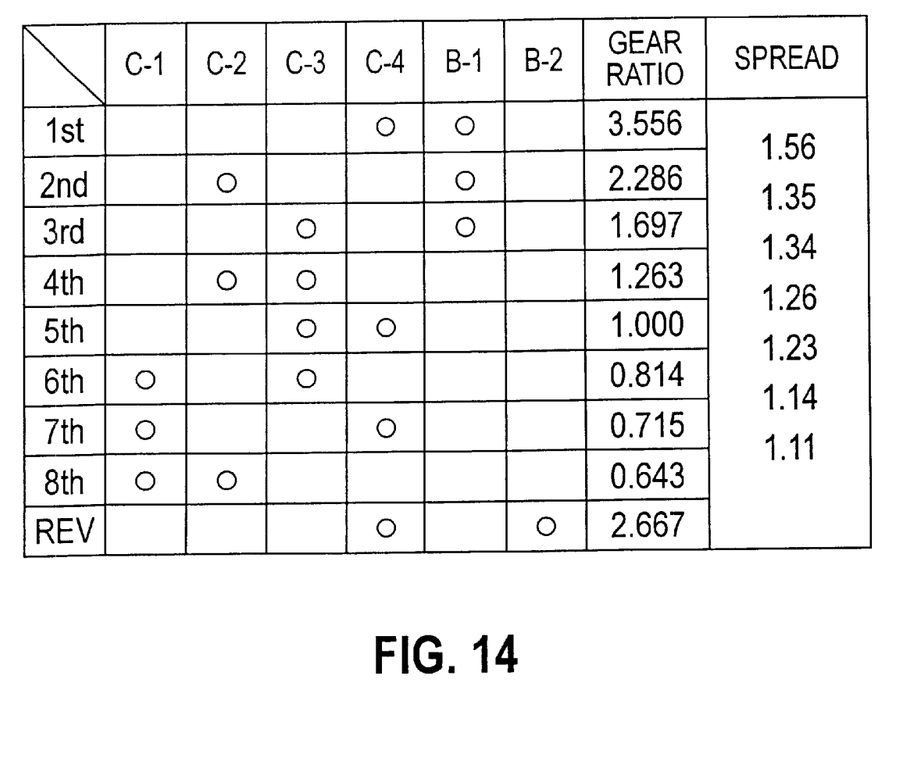
FIG. 14 is a chart showing example settings for gear ratios and gear ratio steps along with operation of the gear train according to the fifth embodiment.
Figure 15:
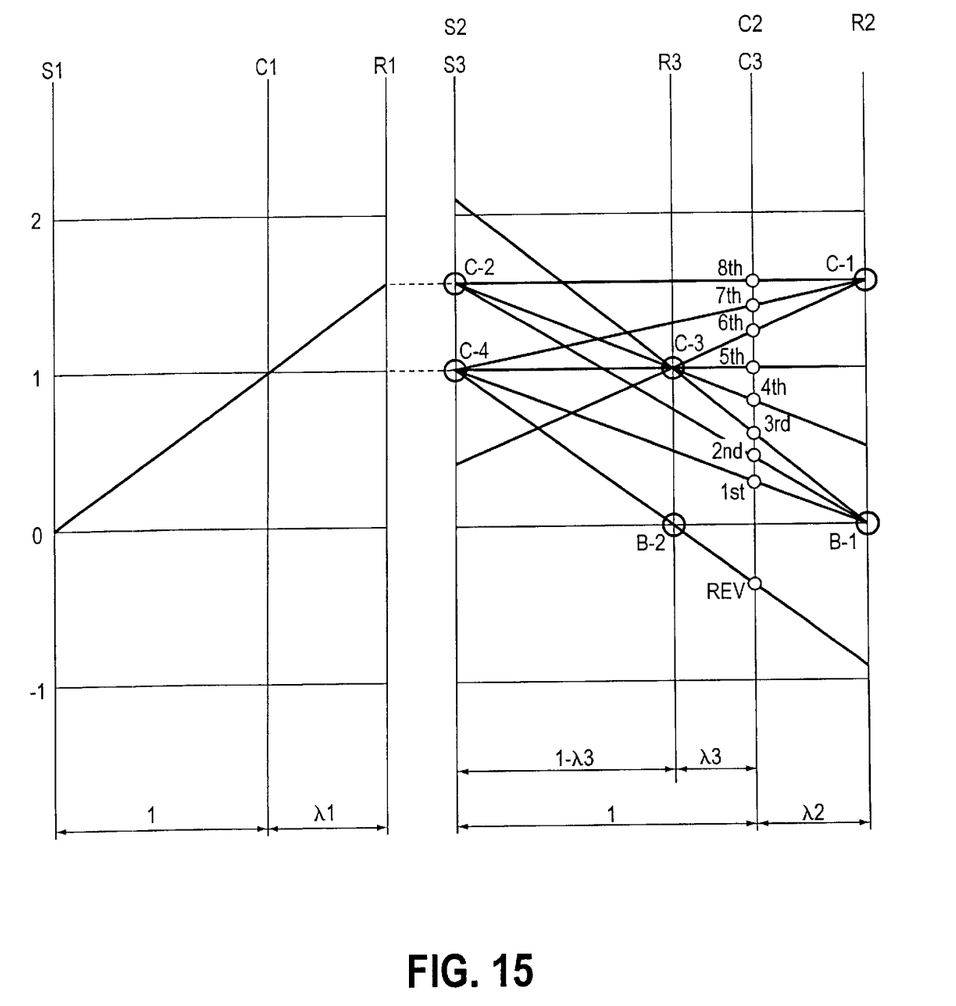
FIG. 15 is a speed diagram of the gear train according to the fifth embodiment.

Next, FIGS. 13 through 15 show a fifth embodiment of a modification of the planetary gear set of four elements of the second embodiment. Describing only the differences of this case from the third embodiment with reference to the skeleton in FIG. 13, this planetary gear set is a Ravigneaux type gear set as described in the second embodiment, in which the sun gear and the ring gear are reversed. That is, it is of a four element construction in which, of the long pinion P2 and the short pinion P3 which are externally meshed together, the long pinion P2 is externally meshed with the common sun gear S2 (S3) as well as internally meshed with the small diameter ring gear R2, and the short pinion P3 is internally meshed with the large diameter ring gear R3. In this case, the common sun gear S2 (S3) of the planetary gear set G, as the first element, is coupled with the hub side of the second clutch (C-2) and the hub side of the fourth clutch (C-4); the ring gear R3 as the second element is coupled with the hub side of the third clutch (C-3) and the hub side of the second brake (B-2); the common carrier C2 (C3) as the third element is coupled with the counter gear 19'; and the small diameter ring gear R2 as the fourth element is coupled with the drum side of the first clutch (C-1) and the hub side of the first brake (B-1).

In the fifth embodiment, a gear ratio as shown in the engagement chart in FIG. 14 is obtained for each speed when the gear ratio of the overdrive planetary gear G1 is set at $\lambda 1=0.556$, the gear ratio on the simple planetary side of the planetary gear set is set at $\lambda 2=0.391$, and the gear ratio on the double planetary side is set at $\lambda 3=0.237$. The total spread in this case is 5.53. The gear ratio step in this embodiment becomes smaller and extremely good closer to the high speed side with no reverse rotation.

FIG. 15 shows a speed diagram showing the relationship between the speeds achieved by engagement of the clutches and brakes (engagement of these is denoted by a circle), and the speed ratio of each element at that time following the same method illustrated in each of the foregoing embodiments. In this embodiment, the common carrier C2 (C3) as the aforementioned third element becomes an output element and a ring gear R3 is used as the second element. As a result, the relationship between the element controlled by the engagement of the third clutch (C-3) and engagement of the second brake (B-2) and the output element is reversed from what it was in the second embodiment. The speed ratio of these in each speed is also reversed, but the behavior of the common sun gear S2 (S3) and the ring gear R2 with respect to engagement of each engagement element at each speed is substantially the same. The free rotation speed ratio of the common sun gear S2 (S3) as the first element when in third speed, however, is substantially the same with respect to what it was in the third embodiment due to the relationship of the gear ratio settings, and the free rotation speed ratio of the ring gear R2 as the fourth element when in reverse is also substantially the same with respect to what it was in the third embodiment.

Above, the present invention has been described using as an example the case in which the second speed ratio is made the overdriven side with respect to the first speed ratio; however, it is possible to make the first speed ratio a speed ratio for a decelerated rotation when the second speed ratio is taken as a speed ratio for input rotation. This kind of first speed ratio is able to be obtained by making the overdrive planetary gear a reduction planetary gear. Further, when the transmission is arranged with two shafts in parallel, it is possible to use the intermeshing counter gear train with a parallel shaft arrangement to enable different speed ratios. Moreover, with regard to the number of speeds, a maximum of eight gears is possible with the transmission, though not all of these must be used; a discretionary number of speeds, such as six or seven speeds, may be selected and used. In any case, the foregoing embodiments are only representational examples. The present invention is not to be limited thereto, but is intended to embrace all such alternatives, modifications and variations that fall within the spirit and broad scope of the appended claims.

What is claimed is:

1. An automatic transmission for a vehicle, comprising:
    a first input path having a fixed first speed ratio with respect to a rotation of an input shaft;
    a second input path having a fixed second speed ratio which is larger than the first speed ratio;
    a planetary gear set of four elements comprising a combination of a plurality of planetary gears, the four elements of the planetary gear set being, in order of rotational speed, a first element, a second element, a third element, and a fourth element;
    a second clutch transmitting a rotation from the second input path to the first element;
    a first clutch transmitting the rotation from the second input path to the fourth element;
    a fourth clutch transmitting a rotation from the first input path to the first element;
    a third clutch transmitting the rotation from the first input path to the second element;
    a first brake engaging the fourth element;
    a second brake engaging the second element; and
    an output member coupled with the third element.

2. An automatic transmission for a vehicle according to claim 1, wherein:
    with respect to engagement of the first brake, a first speed is achieved by engagement of the fourth clutch and a second speed is achieved by engagement of the second clutch;
    with respect to engagement of the third clutch, a third speed is achieved by engagement of the first brake, a fourth speed is achieved by engagement of the second clutch, and a fifth speed is achieved by engagement of the fourth clutch; and
    with respect to engagement of the first clutch, a sixth speed is achieved by engagement of the third clutch, a seventh speed is achieved by engagement of the fourth clutch, and an eighth speed is achieved by engagement of the second clutch.

3. An automatic transmission for a vehicle according to claim 2, further comprising an overdrive planetary gear for overdriving and outputting the rotation from the input shaft, wherein
    the input path from the overdrive planetary gear is the second input path, and
    the input path from the input shaft which does not pass through the overdrive planetary gear is the first input path.

4. An automatic transmission for a vehicle according to claim 2, wherein the planetary gear set comprises:
    a Ravigneaux type gear set in which the first element is a sun gear, the second element is a carrier supporting both a short pinion meshing with this sun gear and a long pinion meshing with this short pinion, the third element is a ring gear meshing with the long pinion, and the fourth element is another sun gear meshing with the long pinion.

5. An automatic transmission for a vehicle according to claim 1, further comprising an overdrive planetary gear for overdriving and outputting the rotation from the input shaft, wherein
    the input path from the overdrive planetary gear is the second input path, and
    the input path from the input shaft which does not pass through the overdrive planetary gear is the first input path.

6. An automatic transmission for a vehicle according to claim 5, wherein the planetary gear set comprises:
    a Ravigneaux type gear set in which the first element is a sun gear, the second element is a carrier supporting both a short pinion meshing with this sun gear and a long pinion meshing with this short pinion, the third element is a ring gear meshing with the long pinion, and the fourth element is another sun gear meshing with the long pinion.

7. An automatic transmission for a vehicle according to claim 1, wherein the planetary gear set comprises:
    a Ravigneaux type gear set in which the first element is a sun gear, the second element is a carrier supporting both a short pinion meshing with this sun gear and a long pinion meshing with this short pinion, the third element is a ring gear meshing with the long pinion, and the fourth element is another sun gear meshing with the long pinion.

* * * * *